(12) United States Patent
Schellhaas et al.

(10) Patent No.: US 11,052,716 B2
(45) Date of Patent: Jul. 6, 2021

(54) MOTOR VEHICLE AXLE

(71) Applicant: Ford Global Technologies, LLC, Dearborn, MI (US)

(72) Inventors: Ralf Andreas Schellhaas, Erftstadt (DE); Jens Glorer, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 16/386,446

(22) Filed: Apr. 17, 2019

(65) Prior Publication Data

US 2019/0322150 A1  Oct. 24, 2019

(30) Foreign Application Priority Data

Apr. 18, 2018 (DE) .......................... 102018205877.6

(51) Int. Cl.
*B60G 13/00* (2006.01)
*B60B 35/00* (2006.01)

(52) U.S. Cl.
CPC .......... *B60G 13/005* (2013.01); *B60B 35/004* (2013.01); *B60G 2204/129* (2013.01); *B60G 2204/1226* (2013.01)

(58) Field of Classification Search
CPC ...... B60G 2204/1226; B60G 2204/129; B60G 2204/41; B60G 2204/4108; B60G 13/005; B60G 13/02; B60G 13/04; B60G 13/16; B60G 13/18; B60G 2200/20; B60G 2200/21; B60G 2202/25; B60G 2206/20; B60G 21/051; F16F 7/1028; F16F 7/108; F16F 7/116; B60B 2900/131; B60B 35/004; B60B 35/006; B60B 35/025; B60B 35/06; B60B 37/10

See application file for complete search history.

(56) References Cited

U.S. PATENT DOCUMENTS

| 7,204,498 | B2 * | 4/2007 | Alesso .................. B60B 35/007 |
| | | | 280/124.106 |
| 7,478,820 | B2 * | 1/2009 | Murata ................... B60B 35/04 |
| | | | 267/188 |
| 7,891,674 | B2 * | 2/2011 | Vaxelaire ............. B60G 21/051 |
| | | | 280/5.524 |
| 7,914,019 | B2 * | 3/2011 | Jakob ..................... B60G 7/008 |
| | | | 280/86.75 |
| 7,946,600 | B2 | 5/2011 | Kobayashi |
| 8,342,547 | B2 * | 1/2013 | Gerrard ............... B60G 21/051 |
| | | | 280/124.128 |

(Continued)

FOREIGN PATENT DOCUMENTS

EP    2714439 B1    3/2016
JP    06239121 A  *  8/1994

(Continued)

*Primary Examiner* — Laura Freedman
(74) *Attorney, Agent, or Firm* — Raymond L. Coppiellie; Burgess Law Office, PLLC

(57) ABSTRACT

An axle for a vehicle, wherein the axle includes a transverse axle portion having a longitudinal end. The axle including a first axle portion connecting the transverse portion to a chassis of the vehicle and a second axle portion connecting the transverse portion to a wheel carrier for supporting a vehicle wheel. A vibration damper is arranged in a receiver in one of the axle portions.

10 Claims, 3 Drawing Sheets

(56) References Cited

U.S. PATENT DOCUMENTS

| | | | |
|---|---|---|---|
| 8,646,789 B2 * | 2/2014 | Ohdo | B60G 21/051 |
| | | | 280/124.106 |
| 9,120,361 B2 * | 9/2015 | Willems | B60G 7/001 |
| 9,463,676 B2 * | 10/2016 | Yamamotoya | B60G 3/14 |
| 9,885,387 B2 * | 2/2018 | Schultz | F16C 27/063 |
| 10,471,793 B2 * | 11/2019 | Kueppers | B60G 21/051 |
| 2006/0220339 A1 * | 10/2006 | Kusaka | B60B 35/02 |
| | | | 280/124.166 |
| 2019/0100066 A1 * | 4/2019 | Knetsch | B60G 13/16 |
| 2019/0329624 A1 * | 10/2019 | Nishino | B60G 11/14 |

FOREIGN PATENT DOCUMENTS

| | | | | |
|---|---|---|---|---|
| JP | 2000313217 A | * | 11/2000 | ............. B60G 7/008 |
| JP | 2001113925 A | * | 4/2001 | ........... B60G 21/051 |
| JP | 2002307922 A | | 10/2002 | |
| JP | 3628620 B2 | | 3/2005 | |
| JP | 4125453 B2 | | 7/2008 | |
| KR | 101526607 B1 | | 6/2015 | |
| WO | WO2017152912 A1 | | 9/2017 | |

* cited by examiner

> US 11,052,716 B2

MOTOR VEHICLE AXLE

CROSS-REFERENCE TO RELATED APPLICATIONS

Not Applicable.

BACKGROUND OF THE INVENTION

1. Field of the Invention

The present invention relates generally to a vehicle axle; and more specifically to a vehicle axle having a vibration damper.

2. Description of Related Art

Axles for vehicles are known which receive at least one wheel. Interfaces for the wheels are fitted on these conventional axles. The interfaces are provided as hubs for the wheels that enable rotation for a rolling of the respective wheel on a surface. Braking devices are furthermore normally provided at the interfaces. The interfaces are arranged on axle portions fitted on the axle. A flange is furthermore fitted on the axle, which flange is fastened to the vehicle. The damping means for damping vibrations generated by the rolling wheels and for reducing transmission of these vibrations to the vehicle are also arranged on the axle. Conventional axles have damping means that stick out or extend from the axle. The damping means reducing the noise level in a passenger compartment of the vehicle. Resonances, which arise because of the rolling of the vehicle and the wheel, are prevented, or at least their amplitudes are reduced, so damage because of continuous changes in load or even a resonance catastrophe at components is prevented. Damping means fitted from the outside on the axle are very complex to attach. It should also be noted that mounting of the axle equipped with the damping means into the vehicle is cumbersome since the damping means must be pretensioned and positioned under tension. Separate tools and devices are necessary which are costly and time-consuming to produce. Such damping means, because of their projecting structure, require additional space, so a compact construction of the entire vehicle is made difficult.

SUMMARY OF THE INVENTION

A vehicle axle including an axle cross member; a first axle portion connecting the axle cross member to a vehicle; and a second axle portion connecting the axle cross member to a wheel carrier. At least one of the first axle portion and second axle portion having a receiver with a vibration damper in the receiver.

Further areas of applicability of the present invention will become apparent from the detailed description provided. It should be understood the detailed description and specific examples, while indicating an exemplary or preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Identical parts are always provided with the same reference numbers in the various figures, which is why these are generally also only described once.

Figure 1:
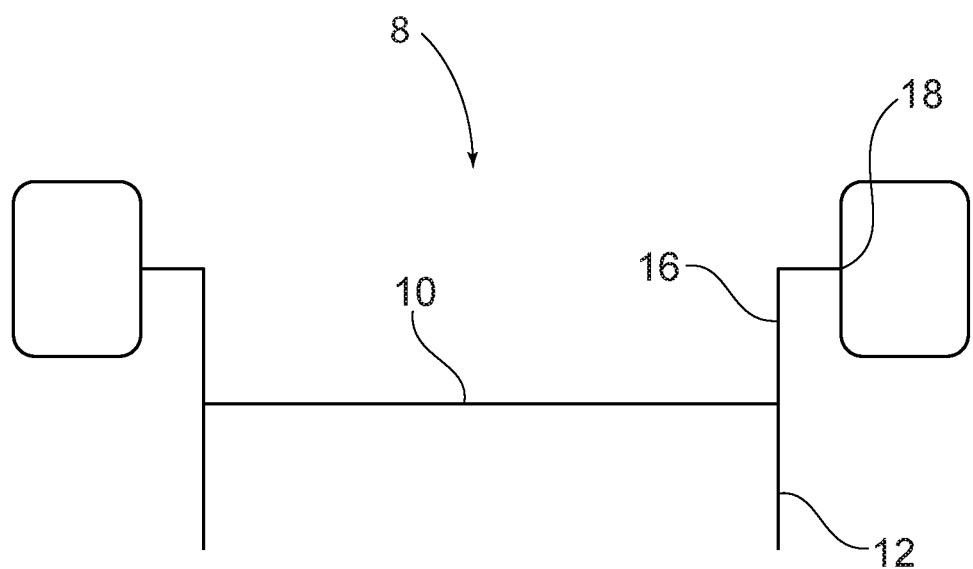
FIG. 1 is a schematic view of a conventional prior art axle.

FIG. 1 shows a conventional, prior art vehicle axle 8 including an axle cross member 10, generally extending in a direction transverse the direction of vehicle travel, having at each longitudinal end, first and second axle portions 12, 16 oriented transversely with respect to the axle cross member 10. The axle portions 12, 16 extending outwardly from axle cross member 10, with each axle portion 12, 16 having an end fitted on or connected to the axle cross member 10. Each axle portion 12, 16 includes a projecting end spaced outwardly from the axle cross member 10. The second axle portion 16 extends in a direction opposite the first axle portion 12. The first axle portion 12 has, at the projecting end, a fastening mechanism, not shown in FIG. 1, for example, a flange, a rubber/metal bearing, or a bushing. The fastening mechanism connected to a vehicle, for example, to an auxiliary frame, a chassis, or the like. The first axle portion 12 therefore connected to the vehicle. Suitable elements, other than the exemplary stated flange, bearing, or bushing can also be the fastening mechanism. While a flange 14 is discussed below as a fastening mechanism, the discussion should not be restrictive. A wheel carrier 18 attached to the second axle portion 16 at its projecting end supports a wheel. The vehicle rolls on the wheels supported by the axle cross member 10 with the rolling motion generating vibrations introduced, via the axle portions 12, 16 and the flange, into the vehicle. The vibrations generate noise in the vehicle, the noise perceived by the vehicle occupants.

Figure 2:
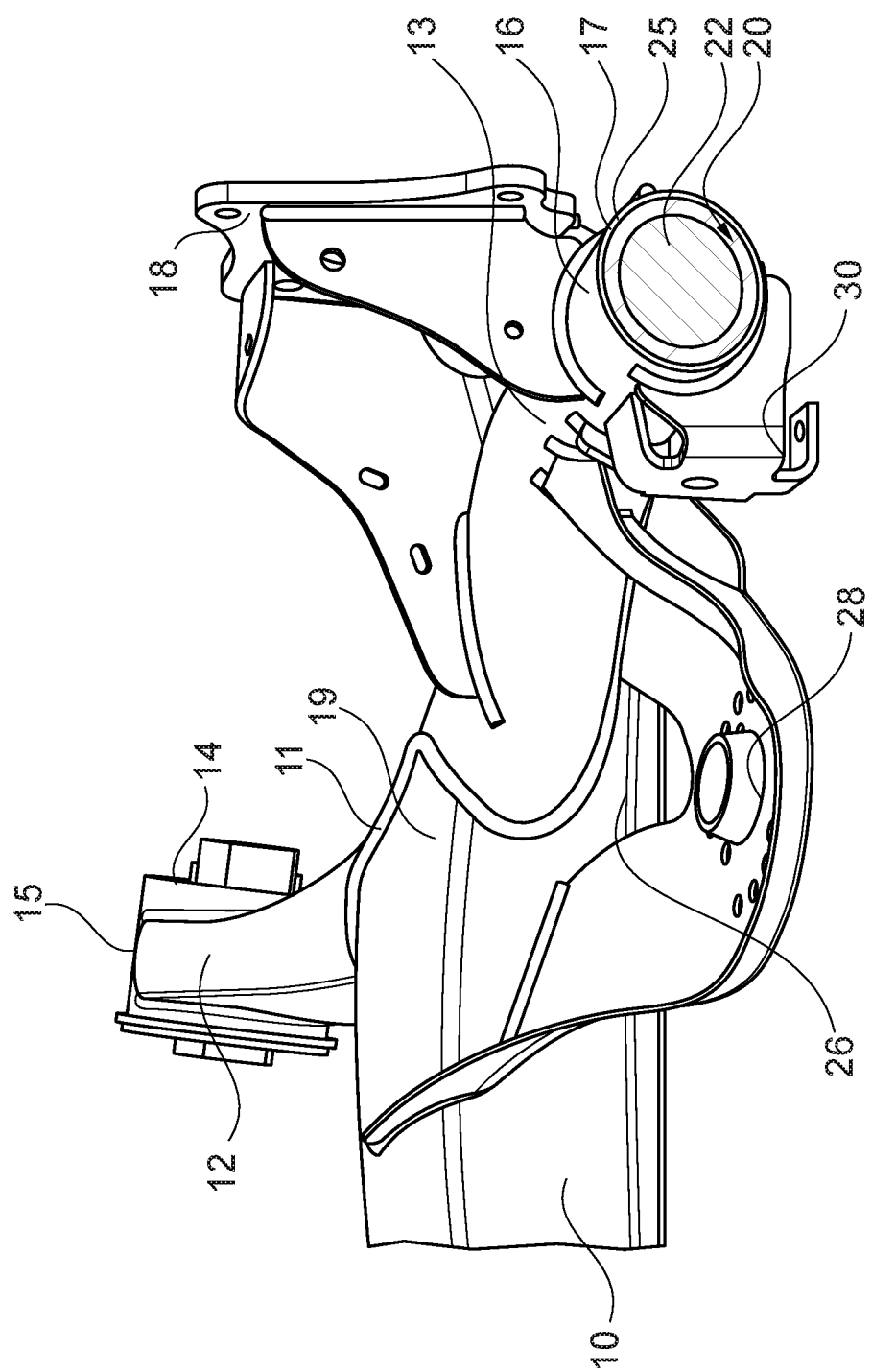
FIG. 2 is a perspective view of an axle including a vibration damper arranged in an axle portion.

FIG. 2 is a partial, cross-sectional view of an embodiment of an axle cross member 10 showing only one side of axle cross member 10, wherein the opposite side is of identical design. The axle cross member 10 includes a longitudinal end 11 and two axle portions 12, 16 connected to the longitudinal end 11. The axle portions 12, 16 and the longitudinal end 11 of the axle cross member 10 forming a multi-part configuration. In one example, the axle portions 12, 16 are welded to the longitudinal end 11 of the axle cross member 10. The axle portions 12, 16 are oriented in the drawing plane transversely with respect to the axle cross member 10, wherein the axle portions 12, 16 extend approximately perpendicular to the axle cross member 10.

In one exemplary embodiment a tubular, longitudinally extending carrier 13 includes the axle portions 12, 16. The first axle portion 12 and second axle portion 16 transitioning integrally from one another. The first axle portion 12 and second axle portion 16 formed as a continuous, seamless tube extending from one end 15 of the first axle portion 12 to one end 17 of second axle portion 16. The term "integrally or integral" means the first and second axle portions are a single-piece component—a one-piece construction, something that is homogeneously formed, for example, components molded, cast or otherwise formed as a single unitary body. Alternatively, the first axle portion 12 and second axle portion 16 comprise a multi-part welded construction. The axle cross member 10 connects to the carrier 13 approximately in the center of the carrier 13, in the longitudinal direction of carrier 13 between the first and second axle portions 12, 16. The carrier 13 connected between ends 15, 17 on the axle cross member 10 with the axle portions 12, 16 sticking out radially from the axle cross member 10, with the ends 15, 17 distally oriented or spaced from the axle cross member 10. The foregoing arrangement results in the longitudinal end 11 of the axle cross member 10 and the carrier 13 having a T-shaped structure. The axle cross member 10 arranged in relation to a longitudinal axis of a vehicle transversely thereto so the carrier 13, including the first and second axle portions 12,16, is oriented substantially parallel to the longitudinal direction of the vehicle. Deviations from the parallel extension can also occur, for example, the bent configuration in FIG. 2.

A wheel carrier 18 for supporting a vehicle wheel is arranged on or adjacent an end 17 of the second axle portion 16. A flange 14 at an opposite end 15 of first axle portion 12 is provided to fasten the first axle portion 12 to the vehicle, in particular to the body or an auxiliary frame or a chassis of the vehicle.

The axle cross member 10 includes a face or surface 26 on which a holder 28 for a spring element of the vehicle is fastened. The holder 28 also arranged on a face or surface of the carrier 13. In addition to the holder 28 for the spring element, a holder for a shock absorber can also be on the axle portion 16.

In on embodiment the carrier 13 is hollow, at least in portions, and has a round, in particular, oval cross-section. The cross-section of carrier 13 varies along its longitudinal direction. In part of the first axle portion 12, the cross-section of the carrier 13 is flattened in the region of its end 15 and forms a transition into an oval form in the region of the mounting area 19 on axle cross member 10. The second axle portion 16 has, for example, a varying oval cross-section that begins in the region of the mounting area 19 and extends to the end 17 of the second axle portion 16.

The second axle portion 16 includes a receiver or receptacle 20, the part of the second axle portion that receives or holds something, in particular, a vibration damper 22. A wall 25 of the second axle portion 16 surrounds and delineates the receiver 20; for example, the receiver 20 is within a tubular cross-section of second axle portion 16. As disclosed, the vibration damper 22 is contained within receiver 20. The vibration damper 22 absorbs vibrations generated a vehicle wheel rolling on the ground. The vibration damper 22 is positioned in the region of wheel carrier 18 and suppresses the vibrations before they are introduced into the vehicle via the flange.

The vibration damper 22 can be at least partially surrounded by the wall 25 fully or in the circumferential direction. In the longitudinal direction of the second axle portion 16, vibration damper 22 can also be covered fully or only partially by wall 25.

If vibration damper 22 is surrounded in the longitudinal direction of carrier 13 and the circumferential direction of receiver 20 by the wall 25, the end of second portion 16, through which the vibration damper 22 is inserted into receiver 20, can be closed or open.

Figure 3:
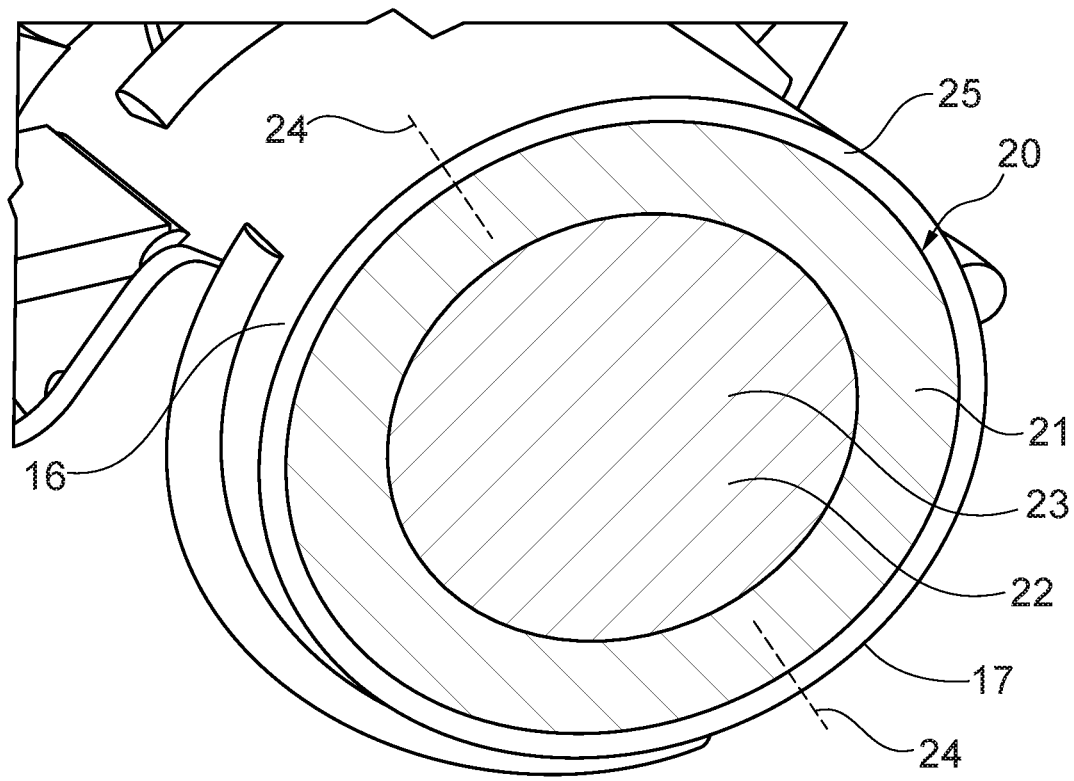
FIG. 3 is an enlarged partial cross-sectional view of the damper within a second axle portion.

Along its longitudinal direction, the tubular second axle portion 16 is provided with the tubular cross-section, wherein, at the end 17 of second axle portion 16, the cross-section that forms receiver 20 is open so the vibration damper 22 can be pushed through this opening of receiver 20 into the tubular cross-section. An enlarged representation of receiver 20 in the region of the opening with vibration damper 22 is represented in FIG. 3.

Once the vibration damper 22 is inserted in the receiver 20, the vibration damper 22 is secured by a firmly bonded, a frictional, or a positive-locking fastening measure. The vibration damper 22 can, for example, be glued in, soldered tight or welded tight. Alternatively, it is possible using a deformation of the wall 25 to fasten vibration damper 22 in the receiver, wherein a crimping process, a caulking process, a crushing process, or a punching/bending process is possible for the shaping the wall 25, the process deforming the wall 25 in a particular radial direction. Shown schematically, separate fasteners 24, for example, screws, rivets, bolts, pins, dowel pins, tension springs, or tongue-and-groove connections can be used. A particular formation of the inside of receiver 20 and the outside of vibration damper 22 can also ensure a fastening of vibration damper 22, wherein, for example, a friction cone or bayonet connection is conceivable. Bolts or screws can be fastened diametrically along the radial direction by wall 25 in vibration damper 22. Two fasteners 24 are preferably used.

The vibration damper 22 constructed from a spring damper 21 and a mass 23, the mass 23 sitting centrally in the receiver 20 and having a round or oval cross-section. The spring damper 21 arranged, at least at one point, between the mass 23 and wall 25. Alternatively, the spring damper 21 can surround the mass 23 in the circumferential direction so, for example, an annular or oval spring damper 21 is formed between the wall 25 and mass 23. To help with or improve insertion of vibration damper 22 into the receiver 20, a sleeve can be arranged radially on the outside on spring damper 21 which, after insertion of vibration damper 22, is arranged between the inside of the wall 25 and spring damper 21.

The spring damper 21 may include a rubber material having elastic properties, wherein the rubber also dissipates energy during its deformation. The rubber can be arranged in an annular form around the mass 23. Also conceivable is constructing the spring damper 21 from a metallic spring element and a damper element for dissipation. An annular spring damper 21 could be formed which has, in a round cross-section, radially arranged pressure springs extending from an outer circumference of the mass 23 to the inside of wall 25 or the sleeve. The space between the mass 23 and wall 25, or the sleeve, is thus partially filled with the radially directed pressure springs with the remaining intermediate space filled with a material for damping. Such a damping material can be a plastic or a rubber.

In an exemplary embodiment, the axle cross member 10 has a first axle portion 12 and a second axle portion 16. The axle cross member 10 is fastened to the vehicle at least with the first axle portion 12, with a flange provided, for example, as the fastening mechanism, the flange can be arranged or formed on the first axle portion 12. The second axle portion 16 includes a wheel carrier 18 to which a wheel can be rotatably fastened. The wheel carrier 18 can additionally have a braking device. The first axle portion 12, in one embodiment through the exemplary flange, is preferably fastened to a vehicle body or an auxiliary frame or a chassis of the vehicle. At least two wheels with the correspondingly configured axle portions can be fitted on the axle cross member 10. Each wheel can roll on a base, wherein vibrations generated by the rolling wheels are transmitted via the wheel carrier 18 and the axle portions 12, 16 to the vehicle.

In particular, a wheel bearing is arranged between the wheel and the wheel carrier 18. To suppress vibrations, a vibration damper 22 is arranged in a receiver 20 in at least one axle portion 12, 16. Since the vibration damper 22 is arranged in one of the axle portions 12, 16, the vibrations are damped immediately after introduction via the wheel carrier 18 into the axle cross member 10, wherein vibrations from the second axle portion 16 to the first axle portion 12 are damped. Insertion of the vibration damper 22 into the receiver 20, in contrast to the prior art, results in compact and efficient damping of the vibrations as the vibration damper 22 does not stick out from the axle cross member 10. The vibration damper 22 need not be pretensioned or screwed on the vehicle during mounting of the axle cross member 10 since the vibration damper 22 can be inserted in advance into the receiver 20, wherein the mounting process of the axle cross member 10 is simplified.

The receiver 20 can advantageously be formed within the axle portion 12, 16 in such a manner that the vibration damper 22 is surrounded at least in part by the axle portions 12, 16. The receiver 20 is integrated in an axle portion 12, 16. The vibration damper 22 is preferably surrounded, at least partially, by a wall 25 of the receiver 20. Ideally, it is surrounded by the receiver 20, resulting in an axle cross member 10 saving installation space as the vibration damper 22 does not protrude beyond the contour of the axle portion 12, 16 having the receiver 20. A robust and simple fastening possibility of the vibration damper 22 is furthermore ensured since the wall 25 of the receiver also forms the wall of the axle portion 12, 16, and is thus characterized by a preferably high bearing capacity.

The receiver 20 has a preferably compact form if it has a tubular shape or configuration, a U-shaped, an H-shaped, a V-shaped, a W-shaped, or square shape or configuration. The receiver 20 can have a cross-section according to a shape mentioned above extending along its main direction in the longitudinal direction of an axle portion 12, 16. The axle portion 12, 16 that contains the receiver 20 is provided continuously with such a cross-section. The cross-section may also change, including transitioning to various forms. Such a variable cross-section can change from a round form into a flattened form or increase or reduce a radius. In the region of the receiver 20, the cross-section is, however, formed preferably to be constant and complementary to the vibration damper 22 and may have, for example, a simply cylindrical outer form. It is, for example, conceivable to form the axle portion 12, 16 to be tubular, wherein the receiver 20 is arranged within the tube. In such a tubularly formed axle portion, the vibration damper 22 is surrounded in the circumferential entirely by the wall 25 of the axle portion 12, 16—the foregoing forming in a compact vibration damper 22 configuration protected from external influences. The tubular axle portion can be round or oval, wherein the vibration damper 22 is correspondingly adapted.

In one embodiment the receiver 20 is preferably arranged also—or only—within the second axle portion 16. The receiver 20 is in front of the wheel carrier 18 for the wheel, and inside the second axle portion 16 so vibrations coming from the wheel are damped by the vibration damper 22 before they are introduced via the flange into the vehicle. The first and second axle portion 12, 16 can be connected, wherein the receiver 20 is positioned between the wheel carrier 18 for the wheel and the point of the connection of the two axle portions. Alternatively, an embodiment is possible, in which the receiver 20 is arranged within the first axle portion 12, and thus the vibrations are also suppressed before introduction into the vehicle.

The first and the second axle portions 12, 16 are oriented transversely with respect to the remaining axle cross member 10. At least one of the two axle portions 12, 16 forms, at least in portions, a right angle with the axle. In particular, a first or a second axle portion 12, 16 is arranged on the longitudinally extended axle cross member 10 in each case in the region of a longitudinal end of the axle cross member 10. The axle portions 12, 16 stick out from the axle cross member 10 in the manner of an extension, and has, at respective distal ends, the wheel carrier for the wheel and the flange for mounting on the vehicle. The vibration damper 22 can be incorporated in at least one of the axle portions 12, 16 that stick out from the axle, wherein a vibration damper 22 is provided in particular for each longitudinal end of the axle so two vibrations dampers 22 are provided in the axle. Alternatively, a vibration damper 22 can be arranged both in the first and in the second axle portions 12, 16.

The axle portions 12, 16 may form an integral transition into one another. The first and the second axle portions 12, 16 can be manufactured, for example, from a joint tube fastened to the axle cross member 10 in a transverse orientation. The fastening can be carried out by welding. Two originally separate axle portions 12, 16 can also be welded on the axle, wherein the two axle portions extend in different, preferably in opposite, directions. The axle portions 12, 16 are preferably oriented at least in portions perpendicular to the axle cross member 10. Various formations of the axles can be realized because of the plurality of possibilities for fastening axle portions to the axle.

To ensure secure positioning of the vibration damper 22, the vibration damper 22 is positioned in the receiver 20 in a firmly bonded manner, for example, by gluing or welding. Alternatively, the vibration damper 22 can be clamped-in, pressed-in, or held in the receiver by a deformation of the wall 25 of the receiver 20, for example, by caulking or crimping. A further embodiment includes fixing the vibration damper with a fastener, for example, a tension spring, a bolt, a pin, a screw, a rivet, or a wedge. A fastening assembly including a tongue-and-groove connection, a cone, or a bayonet connection can also be used depending on the form of the receiver 20 and the vibration damper 22. The plurality of fastening possibilities makes possible a fixed and permanent connection of the vibration damper 22 to the axle portion 12, 16.

In one embodiment, the vibration damper 22 is a damped oscillator with a spring element, a mass 23 and optionally a damping mechanism. The mass is preferably arranged in the receiver 20, wherein the spring element 21 is arranged between the wall of the receiver 20 and the mass 23. The spring element preferably encompasses the mass 23 fully circumferentially. The damping mechanism can also be arranged between the mass 23 and the wall 25 to dissipate kinetic energy conducted by vibrations from the wheels into the mass 23. The damping mechanism and the spring element can be combined to provide a spring damper. For example, a rubber buffer positioned between the mass 23 and the inside of the wall 25. With a round cross-section of a tubular axle portion, the mass is arranged within the receiver 20 and surrounded by the wall 25. The spring damper can also be surrounded by the wall 25 and preferably surrounds the mass 23, so it can oscillate in a damped manner. The entire vibration damper can be arranged in a sleeve making the vibration damper a self-contained unit that can be inserted in one piece into the receiver 20.

One possible embodiment of the damping mechanism includes a sleeve of aluminum, while the mass is a steel inner core. The sleeve and the steel inner core can be uncoupled in a damped manner by a rubber or silicon layer. The steel inner core vibrates in the sleeve in a damped manner because of the elastic layer. The frequency at which the damping mechanism, i.e., the vibration damper vibrates in resonance can be set by the selection of the weight of the steel inner core. The sleeve can also be formed of plastic, steel or other materials.

As disclosed, the vibration damper 22 can be arranged on the first or second axle portion 12, 16. The vibration damper 22 can, however, also be arranged centrally, i.e., in the region of the mounting of carrier 13 on the axle cross member 10. It is also possible to arrange the vibration damper 22 fully continuously in the carrier 13, wherein a configuration interrupted along the carrier 13 is also conceivable. If the carrier 13 is formed from a multi-part construction, the arrangement of the vibration damper 22 in the carrier is simple. The vibration damper can also be placed in a sub-element at the desired location in the suitable length, i.e., also continuously in one piece, wherein the other sub-element(s) is/are subsequently arranged and fastened in a suitable manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle axle comprising:
   an axle cross member;
   a tubular, longitudinally extending carrier, including a first axle portion and a second axle portion;
   the first axle portion and the second axle portion connected to the axle cross member, wherein the axle cross member and the tubular, longitudinally extending carrier form a T-shaped structure;
   the first axle portion and the second axle portion forming a continuous tube extending from a distal end of the first axle portion to a distal end of the second axle portion, the first axle portion and the second axle portion extending radially from the axle cross member, with the distal end of the first axle portion and the distal end of the second axle portion spaced from the axle cross member;
   a wheel carrier connected to the second axle portion adjacent the distal end of the second axle portion;
   the second axle portion having a tubular cross-section including a wall, the wall delineates an interior space bounded by the second axle portion at the distal end of the second axle portion, the wall and the interior space forming a receiver; and
   a vibration damper in the receiver wherein the vibration damper does not protrude beyond an outer surface of the wall of the second axle portion.

2. The vehicle axle of claim 1 wherein the receiver is arranged in the second axle portion, so at least a portion of the second axle portion surrounds the vibration damper.

3. The vehicle axle of claim 1 wherein the receiver has a shape selected from the following, a tubular shape, a U-shape, an H-shape, a V-shape, a W-shape, and a square shape.

4. The vehicle axle of claim 1 wherein the vibration damper is fixed in the receiver as follows, bonded, clamped, pressed-in, or caulked in.

5. The vehicle axle as claimed in claim 1 wherein the vibration damper is fixed in the receiver with a fastener.

6. The vehicle axle of claim 1 wherein the vibration damper includes a spring element and a mass.

7. A vehicle axle comprising:
   an axle cross member;
   a first axle portion connecting the axle cross member to a vehicle;
   a second axle portion connecting the axle cross member to a wheel carrier;
   an integral transition between the first axle portion and the second axle portion, wherein the first axle portion and the second axle portion and the integral transition comprise a seamless tube;
   the second axle portion having a tubular cross-section including a wall defining a hollow portion of the second axle portion, the second axle portion terminating at an open distal end; and
   a vibration damper positioned in the hollow portion of the second axle portion adjacent the open distal end of the second axle portion, wherein the vibration damper is contained in the hollow portion of the second axle portion and the wall of the second axle portion surrounds the vibration damper.

8. The vehicle axle of claim 7 wherein the vibration damper includes a spring element and a mass.

9. The vehicle axle as claimed in claim 7 wherein the vibration damper is fixed in the hollow portion of the second axle portion with a fastener.

10. The vehicle axle of claim 7 wherein the vibration damper is fixed in the hollow portion of the second axle portion as follows, bonded, clamped, pressed-in, or caulked in.

* * * * *